United States Patent
O'Connell et al.

(10) Patent No.: US 11,060,927 B2
(45) Date of Patent: Jul. 13, 2021

(54) STRAIN SENSOR COMPRISING A VISCOUS PIEZORESISTIVE ELEMENT

(71) Applicant: Nokia Technologies Oy, Espoo (FI)

(72) Inventors: Diarmuid O'Connell, Dublin (IE); Nicholas M. Jeffers, Dublin (IE); Oliver Burns, Dublin (IE)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/606,007

(22) PCT Filed: Apr. 20, 2018

(86) PCT No.: PCT/EP2018/060171
§ 371 (c)(1),
(2) Date: Oct. 17, 2019

(87) PCT Pub. No.: WO2018/197355
PCT Pub. Date: Nov. 1, 2018

(65) Prior Publication Data
US 2020/0049576 A1    Feb. 13, 2020

(30) Foreign Application Priority Data
Apr. 24, 2017  (EP) ................................. 17167836

(51) Int. Cl.
*G01L 1/18*    (2006.01)
(52) U.S. Cl.
CPC ..................... *G01L 1/18* (2013.01)
(58) Field of Classification Search
CPC ........................................................ G01L 1/18
USPC ........................................ 73/862.331–862.338
See application file for complete search history.

(56) References Cited

U.S. PATENT DOCUMENTS

| | | | |
|---|---|---|---|
| 6,155,120 A | 12/2000 | Taylor | 73/862.046 |
| 6,543,299 B2* | 4/2003 | Taylor | G01L 1/205 73/862.046 |
| 6,715,363 B1* | 4/2004 | Deng | B06B 1/161 73/782 |
| 8,596,111 B2* | 12/2013 | Dargahi | A61B 90/06 73/78 |
| 9,190,603 B2* | 11/2015 | Colli | G06F 1/163 |

(Continued)

FOREIGN PATENT DOCUMENTS

| | | |
|---|---|---|
| JP | S52-44195 | 4/1977 |
| RU | 2015 141 536 A | 4/2017 |

(Continued)

*Primary Examiner* — Octavia Hollington
(74) *Attorney, Agent, or Firm* — Harrington & Smith (57) ABSTRACT

A strain sensor includes a viscous piezoresistive element embedded or encapsulated within a solid, flexible, resilient packaging element, and a contact contactable from the exterior of the strain sensor and defining an electrical path through or along at least a portion of the viscous piezoresistive element, the resistance of the electrical path varying with deformation of the strain sensor. The invention allows the high gauge factor of a viscous piezoresistive material to be taken advantage of in a practical device by containing the material within a packaging element. The packaging element ensures a consistent output response as a function of deformation of the strain sensor and enables the strain sensor to detect time-varying forces due to the resilient nature of the packaging element.

16 Claims, 5 Drawing Sheets

(56) References Cited

U.S. PATENT DOCUMENTS

| | | | |
|---|---|---|---|
| 2001/0052627 A1 | 12/2001 | Takahashi et al. | 257/415 |
| 2012/0312102 A1* | 12/2012 | alvarez | F16J 15/3296 |
| | | | 73/862.041 |
| 2014/0243709 A1* | 8/2014 | Gibson | A61B 5/447 |
| | | | 600/587 |
| 2015/0287904 A1* | 10/2015 | White | H02N 2/18 |
| | | | 310/319 |

FOREIGN PATENT DOCUMENTS

| | | |
|---|---|---|
| WO | WO 2013/113122 A1 | 8/2013 |
| WO | WO 2015/049067 A2 | 4/2015 |

* cited by examiner

STRAIN SENSOR COMPRISING A VISCOUS PIEZORESISTIVE ELEMENT

TECHNICAL FIELD

The invention relates to strain sensors.

BACKGROUND

Piezoresistive strain sensors use electrical conductance or electrical resistance as the sensed property. Under strain, the geometry of a conductor comprised in such a sensor deforms, changing the end-to-end resistance of the conductor.

SUMMARY

According to a first aspect of the present invention, there is provided a strain sensor comprising a viscous piezoresistive element encapsulated within a packaging element, the strain sensor further comprising contact means contactable from an exterior of the strain sensor and defining an electrical path through or along at least a portion of the viscous piezoresistive element, and wherein the resistance of the electrical path varies with deformation of the strain sensor.

According to an example, a strain sensor allows the high gauge factor of a viscous piezoresistive material to be exploited in a practical strain sensor by embedding or encapsulation of a portion of the viscous material within a packaging element which serves to contain the viscous material. The packaging element provides for a reproducible, consistent and monotonic change in electrical resistance to be produced in response to an applied force. In some examples, the packaging element is resilient, allowing the strain sensor to quickly restore itself to an undeformed state so that the strain sensor may be used in the detection of a time-varying applied force or strain. A strain sensor of the invention is particularly applicable to patient monitoring in a medical context, for example monitoring the pulse of a person at the person's radial artery over long periods as a result of its high sensitivity, high fidelity response, low cost and suitability for integration into a wearable sensing device.

In some examples the viscous piezoresistive element and the packaging element are both laminar elements, i.e. each has a length and a width much greater than its thickness so that each element has two surfaces (the major surfaces of the element) of much greater surface area than the surface area of the edges of the element, the major surfaces of the elements being substantially planar and mutually parallel when the strain sensor is in a non-deformed state. The sensing element is then particularly sensitive to a force applied to a major surface of the packaging element. Conveniently, the major surfaces of the packaging element are rectangular so that the strain sensor has the form of a rectangular lamina or sheet which becomes curved along a direction having a component along the width direction of the lamina and/or a component along its length direction in response to application of a force applied to a major surface of the packaging element, the force having a significant component normal to that major surface.

The contact means may comprise a first pair of electrical contacts each of which contacts a portion of a first major surface of the viscous piezoresistive element. If the strain sensor is deformed such that the first major surface becomes convex then the first major surface will be under tension and the resistance of the electrical path will increase from the value of its resistance when the sensor is in an undeformed condition. If the deformation is such that the first major surface becomes concave, then the surface will be under compression and the resistance of the path will decrease from its value in the undeformed sensor. For some viscous piezoresistive materials, tensile strain within the viscous element will produce a greater change in resistance of the path than compressive strain for a given amount of deformation, thus providing greater sensitivity. In the case of other viscous piezoresistive materials the opposite is true, i.e. the viscous piezoresistive element is more sensitive to compressive forces than to tensile forces. In some examples, a second pair of electrical contacts may be provided, each of which contacts a respective portion on the second major surface of the viscous, piezoresistive element. For example this may allow the strain sensor to be operated in a differential mode, increasing its sensitivity.

According to an example, the contact means may comprise a pair of electrodes each of which contacts a portion of a major surface of the viscous piezoresistive element. This arrangement ensures that the electrical path includes a portion of the viscous piezoresistive element which is under tensile stress when the strain sensor is deformed, thus ensuring a high degree of sensitivity (high gauge factor). Each electrode may comprise copper foil for example. Each electrode may be in contact with substantially the whole of a major surface of the piezoresistive element so that deformation of only a part of the strain sensor may be detected.

The viscous piezoresistive element may comprise a graphene-doped viscous polymer, such as cross-linked polysilicone for example, and/or the packaging element may comprise silicone.

A second aspect of the present invention provides a strain-sensing device comprising a rigid support and a strain sensor of the invention in which the viscous, piezoresistive element and the packaging element are both laminar, the major surfaces of the laminar elements being substantially planar and mutually parallel when the sensor is in a non-deformed state, and the major surfaces of the packaging element being rectangular, and wherein the strain sensor is mounted on the rigid support with two opposing edges of the packaging element substantially fixed in position with respect to the rigid support such that when a force is applied to a major surface of the packaging element it deforms such that it becomes curved along a direction substantially normal to the two opposing edges thereof. This may provide for the sensing element to become curved along a single direction in the plane of the undeformed strain sensor, providing a consistent response to force applied to a major surface of the strain sensor. A strain-sensing device of the invention may be worn on the human body for medical monitoring purposes over extended periods.

In some examples, the rigid support may be configured to allow the strain sensor to be contacted on one major surface thereof, and to prevent the strain sensor from being contacted on the other major surface thereof. This may be especially useful where the contactable surface is intended to be used for pulse detection through the skin of a medical patient, it therefore being desirable to prevent accidental application of a force to the strain sensor on the major surface thereof remote from the skin of the patient. The strain sensor may thus be arranged such that the sensing element has a single contactable major surface.

In some examples, the contactable surface of the strain sensor is mounted on the rigid support such that contactable surface of the strain sensor is recessed within the rigid support. This provides for the strain sensor to be particularly sensitive to forces having a significant component normal to the plane of the contactable surface, whilst being less sensitive to forces with a significant component in the plane of the contactable surface. This is especially useful in pulse detection through the skin of a patient because the sensing element is largely shielded from forces which tend to displace the sensing element with respect to the rigid frame (i.e. forces in the plane of the undeformed sensing element) whilst being sensitive to forces normal to the contactable surface of the sensing element, such as a force provided by the patient's pulse.

The contactable surface of the strain sensor in the device may in some examples have a protrusion located centrally of the contactable surface of the strain sensor with respect to its two opposing edges and extending to or towards the edge of the outer profile of the rigid support. This increases the sensitivity of the device to forces directed normally to the contactable surface, as may be required for example in detection of the pulse of a patient at the patient's wrist. In some examples, the mechanical impedance of the protrusion may be matched to that of the packaging element so that forces applied to the strain sensor of the device are efficiently transmitted to the viscous, piezoresistive element of the sensor. In medical monitoring, for example pulse detection at the wrist of a patient, the mechanical impedance of the protrusion and that of the packaging element may each be substantially equal to that of human skin.

A third aspect of the invention provides strain-sensing apparatus comprising a strain sensor or a strain-sensing device of the invention and detection means for obtaining a measure of the resistance of the electrical path through or along the viscous piezoresistive element. For example, a constant current source may be used to drive a constant current through the strain sensor, the voltage across the strain sensor then being directly related to the extent of deformation of the strain sensor. If a time-varying force, such as that applied by pulse of a patient's pulse, is required to be detected, an AC-coupled amplifier may be used to block the DC component of the detected voltage which may slowly decrease due to settling of the viscous, piezoresistive material after its initial deformation.

A fourth aspect of the invention provides a strain sensor or a strain-sensing device or strain-sensing apparatus of the invention for use in measuring heart rate or pulse rate.

BRIEF DESCRIPTION OF THE DRAWINGS

Example embodiments will now be described, by way of example only, with reference to the accompanying drawings, in which.

DESCRIPTION

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while example embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe example embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Certain known piezoresistive sensors have limited gauge factors of around two due to material and geometrical limitations. Other known sensors based on piezoresistive materials can have gauge factors approaching 100, however the piezoresistive materials used in these sensors have the disadvantages of temperature sensitivity and high fragility.

In certain applications, such as in medical applications for example, detectors with high sensitivity are required. For example, detection of the pulse of a patient may be carried out using table-top medical equipment based on optical detection of pulse waveforms at the patient's radial artery picked up by a cuff worn on the patient's index finger. However this type of equipment is bulky, expensive and suited only to patient monitoring in a hospital or laboratory environment. This means that patient monitoring can only normally take place over short time periods. Also, detection or monitoring which is carried out in a hospital or laboratory environment can lead to spurious results caused by so-called "white coat syndrome", whereby measurements are influenced or corrupted by stress caused to a patient in such environments. Other existing sensors suitable for medical use are wrist-worn sensors which employ optical technology embedded into a strap of a sensor for measuring blood oxygen levels as well as pulse rate, however such devices do not allow hi-fidelity pulse waveforms to be recorded and in addition such devices suffer from inaccuracy due to light contamination. An ECG electrode may be used to measure the electrical stimulus which stimulates the heart-pumping mechanism of a patient using electrical impedance measurements, however such measurements record the electrical stimulus to the heart rather than pulse waveforms at the patient's radial artery, from which additional useful medical information regarding patient health may be derived. Other sensors allow electrical impedance measurements to be obtained by incorporating electrodes onto a mobile device which can provide the equivalent of a single ECG measurement at the fingertip of a patient.

Piezoresistive strain sensors based on graphene have attracted attention because of the high gauge factors achievable on account of the highly-stretchable and piezoresistive nature of graphene. Some of these strain sensors comprise graphene deposited onto a stretchable substrate (e.g. S. Zhu et al, Applied Physics Letters 102 (2013), 161904; S. Bae et al, Carbon 51 (Elsevier, 2013) p 236). In others, graphene is added into a stretchable material (e.g. X. Li et al, Scientific Reports 2 (2012), article 870, DOI 10.1038/srep00870; J. J. Park et al, ACS Applied Materials & Interfaces 7 (2015), p 6317, DOI 10.1021/acsami.5b00695; published International Application WO 2015/049067 A1). Piezoresistive strain sensors have also been realised by doping materials other than graphene into elastomers, for example mercury in rubber or carbon-black in polydimethylsiloxane (PDMS) (N. Lu et al, Advanced Functional Materials (2012), DOI 10.1002/adfm.201200498), and carbon nanotubes within polyurethane (B. C-K. Tee et al, Science 350 (2015), p 314, DOI 10.1126/science.aaa9306). The elastomer PDMS has also been used as the basis of a flexible capacitive pressure sensor (S. C. B. Mannsfeld et al, Nature Materials 9 (2010), p 859, DOI 10.1038/NMAT2834).

Certain viscous piezoresistive materials are known to have very high gauge factors. For example the electrical resistance of graphene-doped, cross-linked polysilicone is known to be highly sensitive to deformation, with a gauge factor greater than 500, thus offering potential for a highly sensitive strain sensor (see for example C. S. Boland et al, Science 354 (2016), p 1257). However, viscous materials have several disadvantages due to their semi-liquid nature. For example they present practical problems of confinement or containment, and the resistance of such materials can change non-monotonically and inconsistently with deformation.

Figure 1:
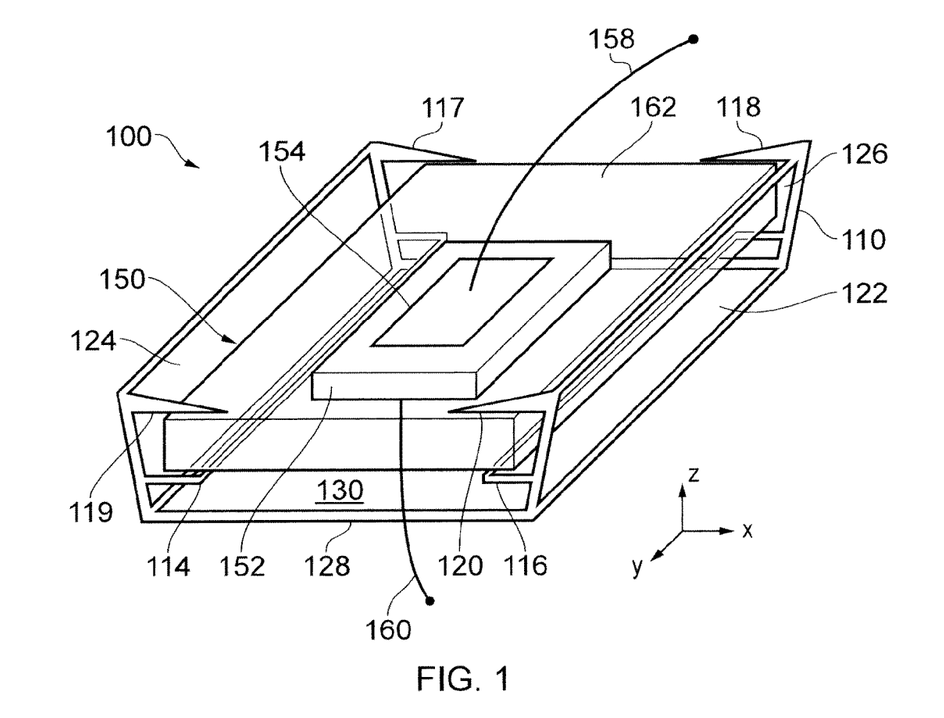
FIG. 1 is a perspective view of a strain-sensing device according to a first example.
Figure 2:
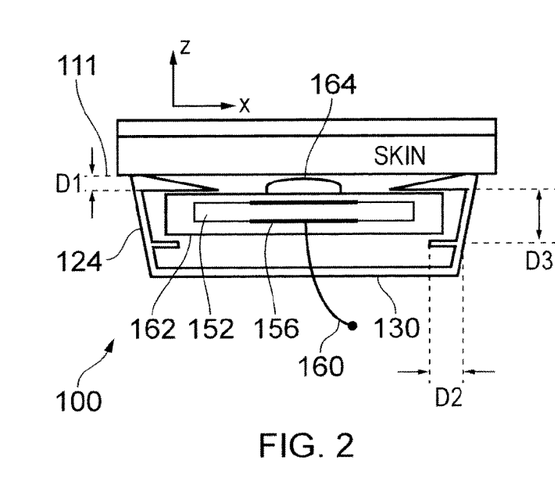
FIGS. 2 & 3 show sections through the FIG. 1 device when the device is in unloaded and loaded conditions, respectively.

Referring to FIGS. 1 and 2, a strain-sensing device indicated generally by 100 is shown in an unloaded condition with reference to a Cartesian coordinate system with x, y, z directions as indicated in FIG. 1. The device 100 comprises a strain sensor 150 mounted in a rigid support 110. The strain sensor 150 comprises a viscous, piezoresistive element 152 (in this example a graphene-doped, cross-linked polysilicone putty element) embedded or encapsulated within a solid, flexible and resilient packaging element 162 (in this example a polysilicone packaging element.) The viscous, piezoresistive element 152 and the packaging element 162 are both generally laminar in form, i.e. the thickness (z dimension) of any one of these elements is much smaller than its length or width (y or x dimensions respectively). Each element 152, 162 therefore has two major surfaces which are spaced apart in the z direction. In this example, the x, y and z dimensions of the strain sensor 150 are 10 mm, 17 mm and 1 mm respectively, but any suitable dimensions may be used. The viscous, piezoresistive element 152 is arranged centrally within the packaging element 162 in the x, y and z directions. The major surfaces of the elements 152, 162 are substantially mutually parallel when the device 100 is unloaded. The strain sensor 150 further includes a pair of rectangular copper foil electrodes 154, 156 (other suitable shapes and materials may be used) each of which is in contact with a respective major surface of the viscous, piezoresistive element 152 and arranged centrally with respect to the element 152 in the xy plane. The electrodes 154, 156 are flexible, laminar and metallic and are each provided with a respective wire 158, 160 which contacts a respective electrode and which passes through the packaging element 162 to an exterior of the strain sensor 150, thus allowing a measure of the resistance of the material 152 to be obtained. In FIG. 2, wire 158 which contacts electrode 154 is omitted in the interests of clarity.

The rigid support 110 has side walls 122, 124, 126, 128 and a bottom wall 130 which protect the sensing element 150 so that it may only be contacted on the upper major surface of the packaging element 162 (i.e. the major surface of the piezoresistive element 152 which is uppermost in FIG. 1 or the major surface with the greatest z coordinate). The rigid support 110 also has two longitudinal ledges 114, 116 which extend a short distance from the side walls 122, 124 in the x direction and which extend along the length of the rigid support 110 in the y direction. The strain sensor 150 is supported by its two opposing edges in the x direction by the ledges 114, 116. The strain sensor is retained within the rigid support 110 by four projections 117, 118, 119, 120. Projections 117, 119 project from side wall 124 in the xy plane in the positive x direction. Projections 118, 120 project from side wall 122 in the xy plane the negative x direction.

The upper major surface of the packaging element 162 is recessed within the rigid support 110 by a distance D1, i.e. the upper major surface is displaced by a distance D1 in the z direction with respect to the outer profile 111 of the rigid support 110; this ensures that the strain sensor 150 is not subject to forces having a large component in the xy plane which may displace the strain element 150 in the x and/or y-directions with respect to the rigid support 110.

The distance D3 in the z direction between the projections 117, 118, 119, 120 and the ledges 114, 116 is somewhat greater than the thickness of the strain sensor 150 in the z direction. The width of the rigid support 110 in the x direction is somewhat greater than the width of the strain sensor 150 in the x direction; a finite gap of width D2 exists between the side wall 122 and the edge of the strain sensor 150 adjacent the side wall 126. A similar gap exists between the side wall 124 and edge of the strain sensor 150 adjacent to side wall 124. These features allow the strain sensor 150 to flex as required to a useful degree without significant mechanical resistance from the rigid support 110.

The upper surface of the packaging element 162 (i.e. the contactable, major surface of the packaging element having the greater z coordinate) has a longitudinal polysilicone projection 164 (not shown in FIG. 1) positioned centrally on the contactable surface in x direction and extending the length of the strain sensor 150 in the y direction but having a limited extent in the x direction. The projection 164 extends towards the outer profile 111 of the rigid support 110. The presence of the projection 164 means that the strain sensor 150 of the device 100 is particularly sensitive to forces in the negative z direction which act centrally in the x direction and which impinge on the sensor 150 via the projection 164. Such forces produce a greater deformation of the sensor 150 compared to forces of similar magnitude in the negative z direction but which act on the contactable surface of the sensor 150 at other positions in the x direction. FIG. 2 shows the strain sensing device 100 held in position against a portion of skin at the wrist of a patient whose pulse is to be monitored. The rigid frame is held in position by means of a wrist-band (not shown) so that the rigid frame 110 is held securely against the skin with the projection 164 in light contact with the skin or held a small distance away from it.

Figure 3:
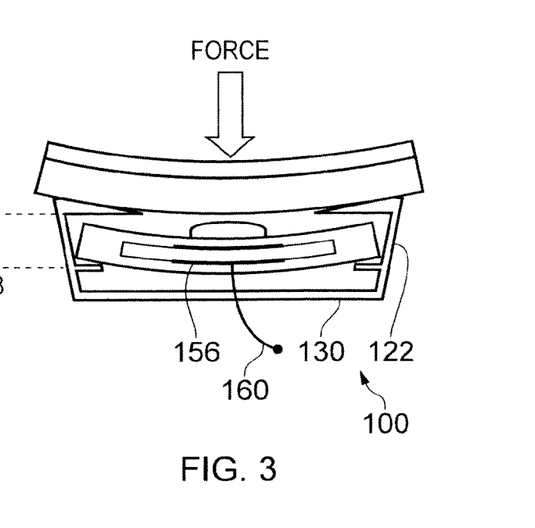

FIG. 3 shows the strain sensing device 100 with the strain sensor 150 deformed by a force applied to the projection 164 in the negative z direction by the pulse of the patient which forces the patient's skin at the wrist slightly within the outer profile 111 of the rigid support 100. Certain reference signs and parts are omitted in FIG. 3 in the interests of clarity. In FIG. 3 the strain sensor 150 is curved in the x direction but has no curvature in the y direction. The upper major surface of the viscous, piezoelectric element 152 is compressed so that the resistance of that surface is reduced compared its unloaded resistance. The lower major surface of the viscous, piezoresistive element 152 is stretched; the resistance of this surface is increased compared to its resistance when the strain sensor 150 is unloaded. The tensile gauge factor of the viscous, piezoresistive element 152 is greater than its compressive gauge factor so that the resistance of the electrical path between the two electrodes 154, 156 increases when the strain sensor 150 of the device 100 is deformed as depicted in FIG. 3. For small forces, the resistance of the electrical path between the electrodes 154, 156 is an essentially linear and monotonic function of the force applied to the projection 164. If the force is removed, the strain sensor 150 returns to its unloaded state as shown in FIG. 2. If the force is maintained for a significant time, then the resistance of the electrical path between the electrodes 154, 156 slowly begins to reduce as the viscous piezoelectric material of the element 152 settles and electrical connections within the material begin to form following the breaking of such connections when the force is initially applied.

In an alternative embodiment, ledges 114, 116 extend from walls 126, 128 a short distance in the y direction and extend the length of the support 110 in the x direction so that the rectangular sensor 150 is supported by its short edges. The strain sensor 150 then deforms under loading such that curvature is produced along the y direction, i.e. the longer dimension of the strain sensor 150, which results in increased sensitivity.

Figure 4:
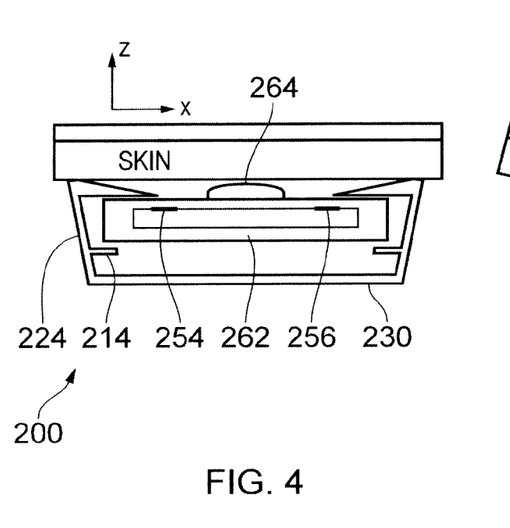
FIGS. 4 & 5 show sections through a second example strain-sensing device when the device is in unloaded and loaded conditions, respectively.
Figure 5:
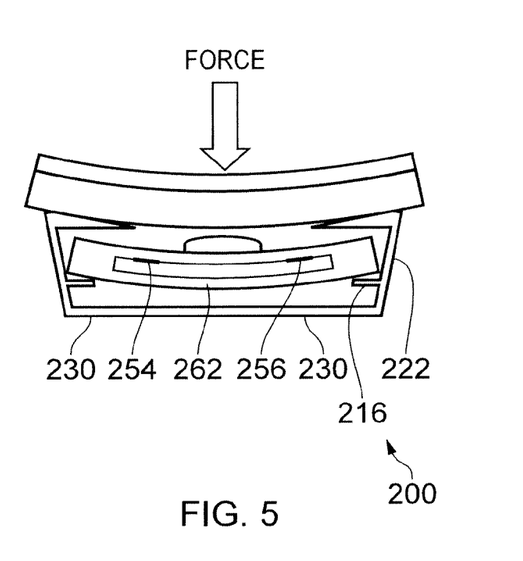

FIGS. 4 and 5 show sections in the xz plane of another strain sensing device 200, which is similar in construction to the device 100, in loaded and unloaded conditions respectively. Parts of the device 200 are labelled with reference signs which differ by 100 from reference signs labelling corresponding parts of the device 100. The device 200 has two electrodes 254, 256 which contact respective portions of the upper major surface of a viscous piezoelectric element 252. In the loaded condition of the device 200 (FIG. 5), the electrical path between the electrodes 254, 256 is compressed and therefore has a lower resistance compared to the resistance of the path in the unloaded condition (FIG. 4).

Figure 6:
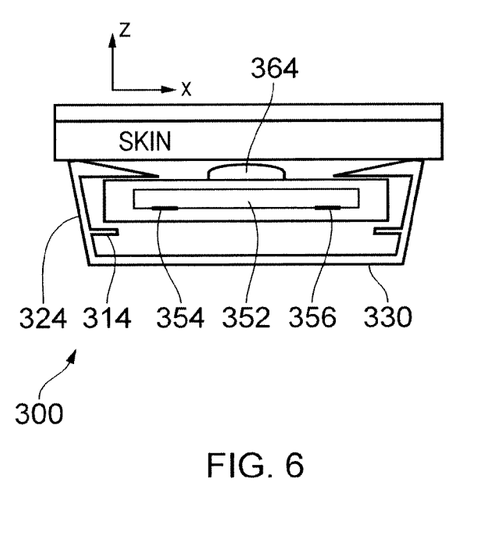
FIGS. 6 & 7 shows sections through a third example strain sensing device when the device is in unloaded and loaded conditions respectively.
Figure 7:
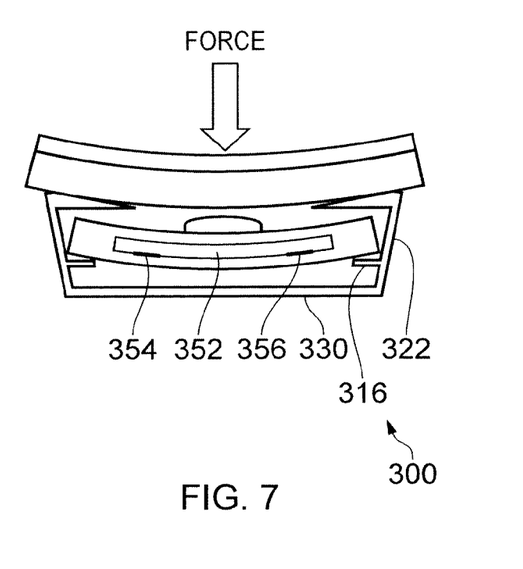

FIGS. 6 and 7 show sections in the xz plane of another strain sensing device 300, which is similar in construction to the device 100, in loaded and unloaded conditions respectively. Parts of the device 300 are labelled with reference signs which differ by 200 from reference signs labelling corresponding parts of the device 100. The device 300 has two electrodes 354, 356 which contact respective portions of the lower major surface of a viscous piezoelectric element 352. In the loaded condition of the device 300 (FIG. 7), the electrical path between the electrodes 354, 356 is under tension and therefore has a higher resistance compared to the resistance of the path in the unloaded condition (FIG. 6).

Since the gauge factor of graphene-doped polysilicone is greater for compressive deformation than its gauge factor for tensile deformation, the sensitivity of the device 300 is greater than that of the device 200, because in the loaded device 300, current passing between contacts 354, 356 moves along a path which includes parts of the element 352 which are stretched, whereas current passing between contacts 254, 256 in the loaded device 200 remains largely confined to the upper major surface of the element 252. In the loaded device 100 (FIG. 3), the electrical path between the two electrodes 154, 156 includes both compressed and stretched parts of the element 152.

As indicated above, the viscous, piezoelectric elements 152, 252, 352 of the devices 100, 200, 300 are portions of graphene-doped polysilicone, which has a putty-type consistency. Such putty material can be fabricated as follows. Boric acid (e.g. Sigma Aldridge, CAS number 10043-35-3, lot number 32030-119) is mixed with silicone oil (a low molecular weight polydimethylsiloxane, PDMS, for example from VWR, CAS #63148-62-9, Product #83851.360, batch 12F140500) at 300 mg/mL in a vial. The kinematic viscosity of the pristine oil is ~350 mm$^2$/s, equivalent to a viscosity of 0.34 Pas, consistent with a low molecular weight of ~15 kg/mol (degree of polymerization ~150 repeat units per chain). This molecular weight is below the critical molecular weight (20-30 kg/mol) which results in entanglement. The mixture is stirred on a hot plate at room temperature until homogeneous, resulting in a solution that is milky in appearance. During stirring, heat is slowly applied until the temperature reaches ~190° C. and the mixture is then left for about one whilst stirring at constant temperature. During this process the silicone polymer becomes cross-linked, forming a viscous, sticky gum. This gum is left to cool, forming a viscoelastic putty which can be removed from the vial with a spatula. The process is similar to that used to form the toy material "Silly Putty" (® Crayola Industries, Inc.), although Silly Putty typically also contains other ingredients.

Graphene nano-particles are doped into the putty. Graphene dispersions may be prepared by the ultrasonic tip-sonication of graphite (e.g. Branwell, Graphite Grade RFL 99.5) in N-methyl-pyrrolidone (NMP) at 100 mg/mL (total volume ~300 mL) for 72 hours at 80% amplitude. This is followed by a mild centrifugation at 1500 rpm for 90 minutes to remove unexfoliated aggregates and very large nanosheets. The resulting dispersion is then vacuum filtered onto a 0.1 μm pore size polyester membrane to form a thick film of re-aggregated nanosheets. The film is then re-dispersed at high concentration (~10 mg/mL) in chloroform by ultrasonic tip-sonication for ~1.5 hours.

The material for the packaging elements 162, 262, 362 may be T15 Translucent Silicone supplied by Polycraft. This material is a twin-component, high strength, flexible, low viscosity moulding compound. It is prepared by mixing equal amounts of both components which is then de-gassed for 20 minutes under a vacuum. The silicone is then placed in moulds and left to set for three hours. When removed from the moulds the silicone has cavities into which the graphene-doped polysilicone putty material is placed. The putty material is placed in a cavity mould and released into the required shape and form. Portions of flexible copper foil may be used as electrodes and gage aluminum wire soldered to each electrode to provide electrical contacts. The putty material is sandwiched between the copper foil electrodes and place into a silicone cavity which is then over-moulded with a second silicone pour completely encapsulating or embedding the putty/electrode device within a silicone packaging element.

The rigid supports 110, 210, 310 of the strain sensing devices 100, 200, 300 may be formed by 3D printing, for example using "Clear" photopolymer resin with a "Form 2" or "Form 1+" 3D printer (Formlabs, Somerville, Mass., USA). Other techniques may also be used to produce the rigid supports, such as plastic moulding for example.

Figure 8:
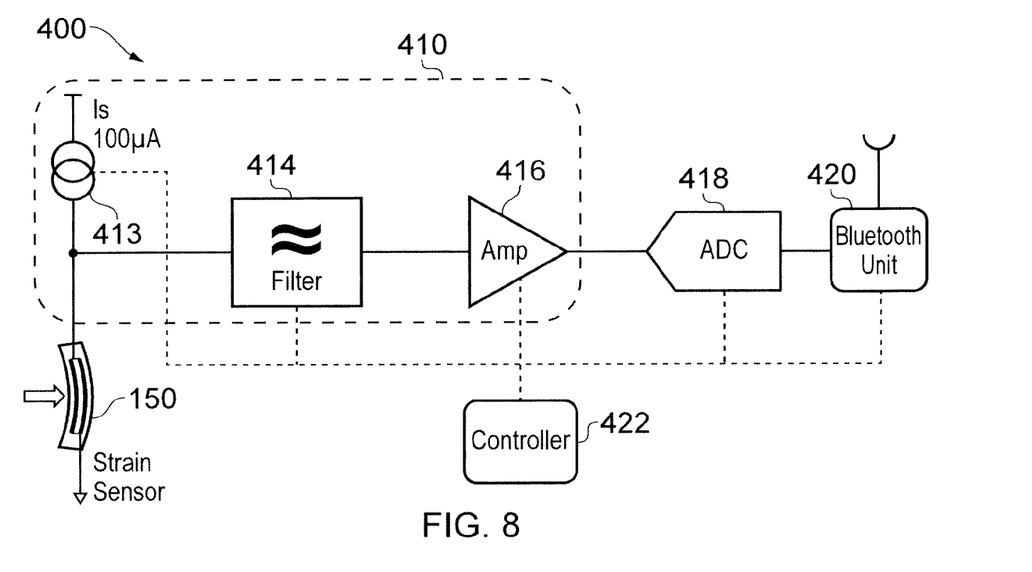
FIG. 8 shows an electronic arrangement for detecting changes in the resistance of an electrical path in a strain sensor comprised in the FIG. 1 device.

FIG. 8 shows a strain sensing apparatus 400 which includes the strain sensor 150 and an electronic arrangement for gathering and transmitting data corresponding to strain or force measurements derived from the strain sensor 150. The electronic arrangement shown in FIG. 8 is particularly applicable where the sensor 150 is comprised in a strain sensing device such as 100 which is attached to, for example, the wrist of a patient in order to carry out pulse detection and monitoring, and may be integrated into the rigid support of the strain sensing device together with a battery power supply.

The electronic arrangement comprises a front-end circuit 410, an ADC 418, a Bluetooth® unit 418 and a controller 422. The front-end circuit 410 comprises a fixed or constant current source 413 in series with the strain sensor 150. The voltage developed across the electrical path within the viscous, piezoresistive element 152 of the sensor 150 represents the force or strain incident on the sensor 150. Where the force applied to the strain sensor 150 has a constant component, as when the strain sensing device 100 is held against a patient's wrist by an elastic wrist-band for example, the voltage developed across the sensor has a slowly-reducing component because the viscous piezoresistive material of the element 152 settles over time following its initial deformation, causing electrical connections to form within the material and reducing the resistance of the electrical path through the material from its value immediately after deformation from the sensor's unloaded state. A filter 414 (e.g. a blocking capacitor) is used to block slowly varying DC components of the voltage developed across the strain sensor 150. Transient components are amplified by an amplifier 416, digitised by ADC 418 and then passed to Bluetooth® unit 420 for transmission to a remote location where data recording and/or analysis is carried out. The controller 422 controls the rate of sampling of the voltage across the sensor 150 and/or the rate of data transmission in order to maximise battery life. The controller 422 may also include a shutdown mechanism to reasonably control the power dissipation of the electronic arrangement when not in use.

The gain of the amplifier 416 is set to maximise signal-to-noise ratio by gaining the voltage signal across the strain sensor 150 whilst also ensuring that the amplified voltage signal does not saturate the following analogue-to-digital converter 418. The controller 422 is arranged such that the operating and communications protocols of the electronic arrangement maximise battery lifetime whilst ensuring that enough data is captured for the application in question. Part of this control may include reasonable efforts to minimise power consumption by either turning off electronic components or putting them in low power sleep modes when not in use. The controller may also control communication protocols such that a number of readings are taken before being sent in a single wireless transmission. Additionally, the controller may also provide signal processing of data before transmission.

Figure 9:
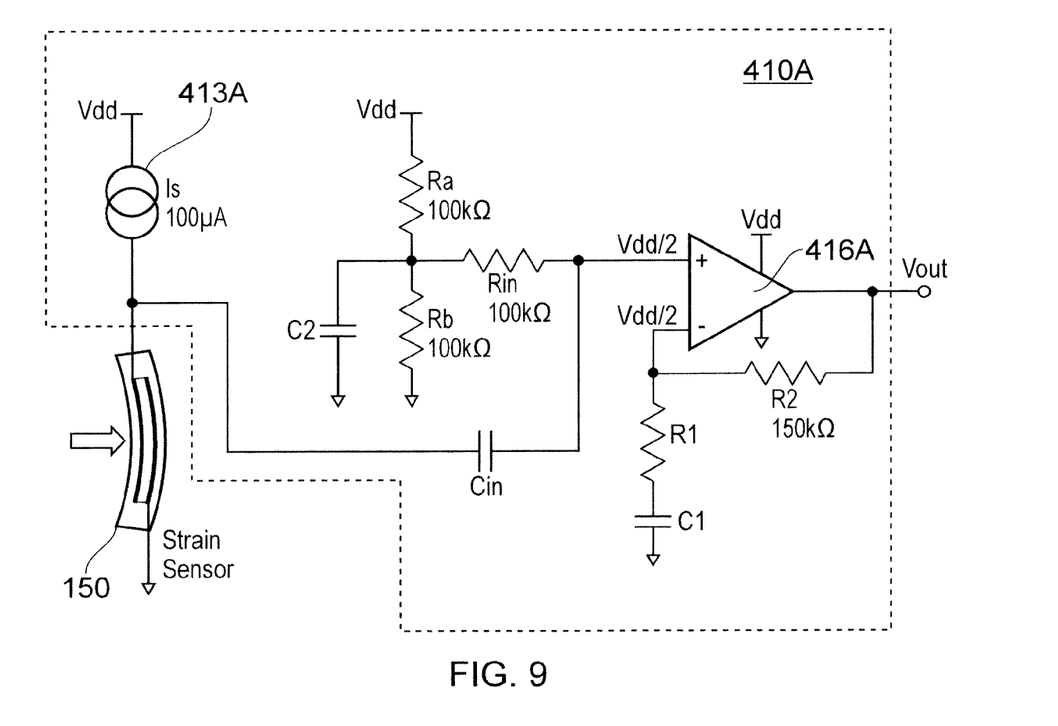
FIGS. 9 & 10 show example front-end circuits for use in the FIG. 8 arrangement.
Figure 10:
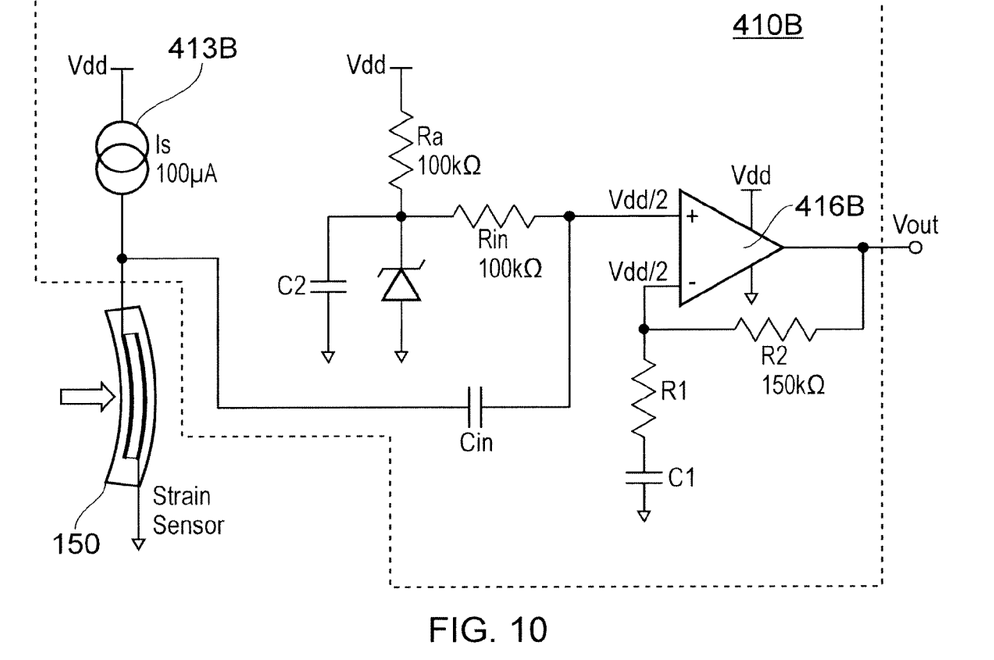

FIGS. 9 and 10 show two detailed examples of suitable front-end circuits 410A, 410B. In unit 410A, the voltage developed across the sensor 150 by a constant current source 413A is AC coupled to a non-inverting amplifier 416A that uses a resistor divider (Ra and Rb) to set the voltage on the noninverting input of the amplifier 416A equal to half the supply voltage (Vd) of the circuit 410A. Means are included to maximise Power Supply Rejection (PSR) and to ensure stability. Capacitor C2 is included to bypass the midpoint of Ra and Rb for AC signals, thus improving PSR. The value of C2 should be selected to ensure that the circuit 410A effectively bypasses all frequencies within the circuit's passband. Without this filtering, AC signals on the power supply would feed directly to the inverting input of the amplifier 416A and possibly initiate instability. Rin is selected to minimise input bias current errors, according to R2=Rin+(½ Ra). The value of R1 and R2 determine the gain and C1 needs to be sized such that Xc1<<R1 for the passband of interest.

In the alternative front-end circuit 410B of FIG. 10, the resistor divider input biasing scheme of circuit 410A is replaced by a Zener diode regulator. The circuit 410B further improves PSR. Alternative approaches include using an inverting amplifier configuration.

Figure 11:
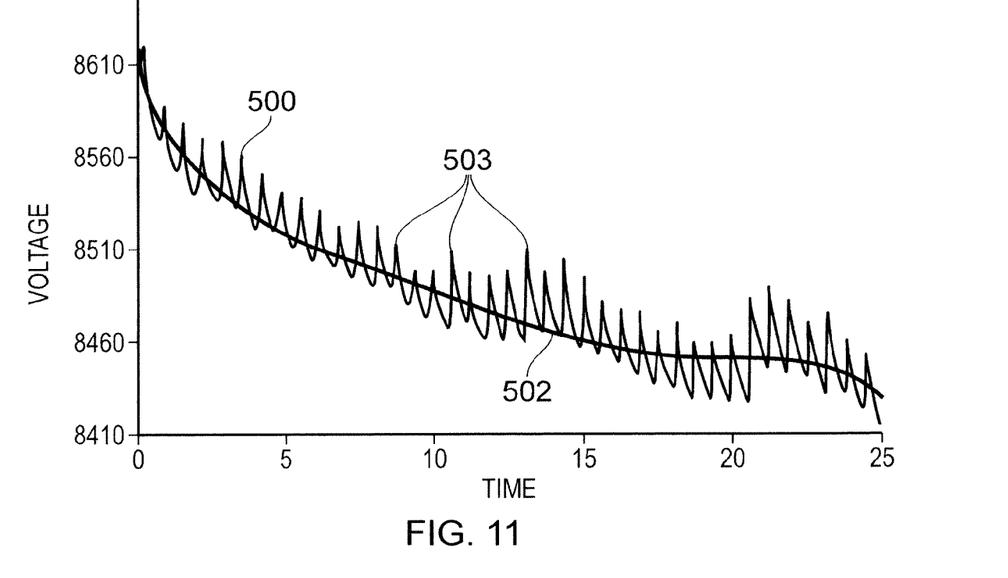
FIG. 11 shows output from a strain-sensing device when the device was used to monitor a patient's radial artery pulse.
Figure 12:
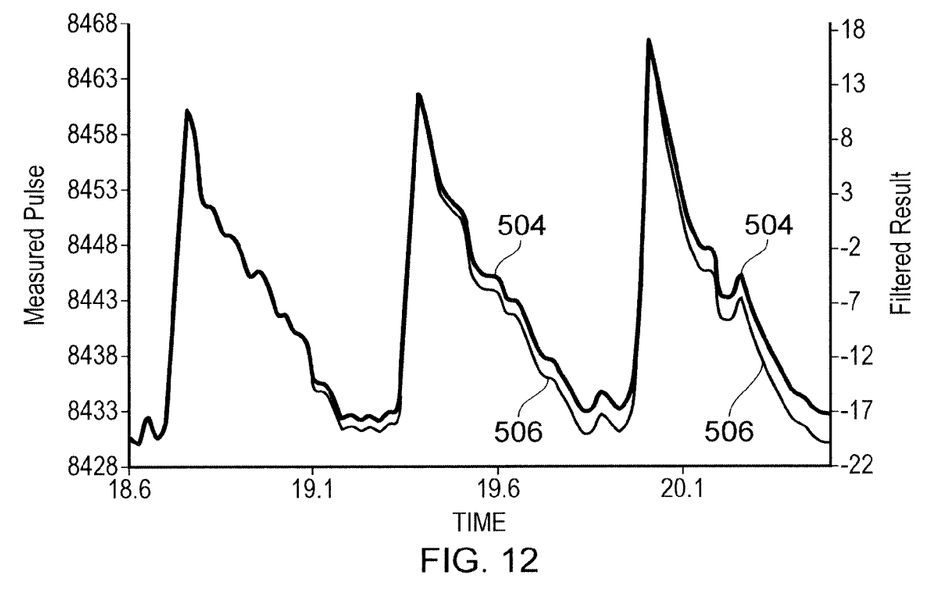
FIG. 12 shows the output of FIG. 11 following mathematical processing to remove DC drift and also DC-filtered output of the device.

FIG. 11 shows a voltage output 500 of the strain-sensing device 100 obtained during monitoring of a patient's pulse at the radial artery of the patient. A constant current source was used to drive a constant current through the sensor 150 of the device 100. Individual pulses, such as 503, are clearly visible. The output 500 has a generally decreasing DC component 502 because when the device 100 is applied to the patient's wrist (for example) by means of an elastic wrist band (for example) a component of the deformation of the strain sensor 150 is constant; the DC component 502 of the output 500 gradually decreases over time from its initial (t=0) value as electrical connections form in the viscous piezoresistive element 152 following the breaking of such connections when the device 100 is initially attached to the patient. The DC component 502 was blocked using an AC-coupled amplifier (as in the arrangements of FIGS. 9 and 10 for example), resulting in a waveform 504 in FIG. 12. Data corresponding to the output 500 was processed mathematically by deriving a polynomial fit of the data and subtracting its DC component from the data, resulting in waveform 506 in FIG. 12. The two waveforms 504, 506 are substantially identical. The waveforms 504, 506 both show the anacrotic maximum and dicrotic notch, indicating that the patient's pulse was detected by the device 100 with high fidelity.

Figure 13:
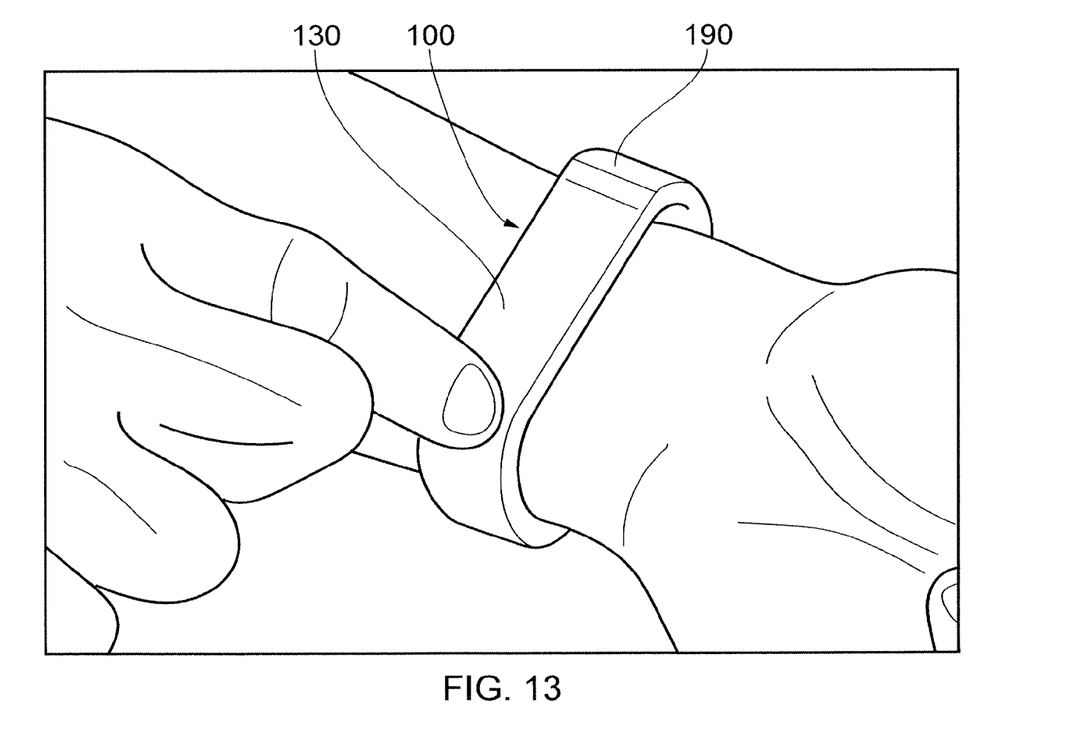
FIG. 13 illustrates use of the device of FIGS. 1-3 as a pulse or pulse rate monitor on a person's wrist.

Referring now to FIG. 13, the strain-sensing device 100 of FIGS. 1-3 is shown in use as a pulse or pulse-rate monitor on a person's wrist. The bottom wall 130 of the device 100 is uppermost in FIG. 13. The contactable surface of the packaging element 162 and the protrusion 164 are held adjacent the skin of the person's wrist. The device 100 is held in position by an elastic wrist band 190. The wrist band 190 and the device 100 thus constitute a wearable (wrist-worn) pulse monitoring and/or pulse detection device.

The present inventions can be embodied in other specific apparatus and/or methods. The described example embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A strain sensor, comprising:
   a viscous piezoresistive element encapsulated within a packaging element, the strain sensor further comprising,
   at least one contact which is configured to be contacted from an exterior of the strain sensor and defining an electrical path through or along at least a portion of the viscous piezoresistive element,
   wherein the strain sensor is deformable in a first direction without being deformable in a second direction,
   wherein a resistance of the electrical path varies with the deformation of the strain sensor,
   wherein the strain sensor further comprises a capacitive filter in the electrical path, and
   wherein the capacitive filter is configured to block a varying voltage across the strain sensor.

2. A strain sensor according to claim 1 wherein the viscous piezoresistive element and the packaging element are both laminar elements having major surfaces which are substantially planar and mutually parallel when the strain sensor is in a non-deformed state.

3. A strain sensor according to claim 2 wherein the major surfaces of the packaging element are rectangular.

4. A strain-sensing device comprising a rigid support and a strain sensor according to claim 3, wherein the strain sensor is mounted on the rigid support with two opposing edges of the packaging element substantially fixed in position with respect to the rigid support such that a force applied to a major surface of the packaging element deforms the packaging element such that upon the strain sensor being deformed in the first direction the packaging element is curved in a direction substantially normal to the two opposing edges thereof.

5. A strain-sensing device according to claim 4 wherein the rigid support is configured to allow the strain sensor to be contacted on one major surface thereof and to prevent the strain sensor from being contacted on the other major surface thereof.

6. A strain-sensing device according to claim 4 wherein the strain sensor is mounted on the rigid support such that the contactable surface of the strain sensor is recessed within the rigid support.

7. A strain-sensing device according to claim 6 wherein the contactable surface of the strain sensor has a protrusion, the protrusion being located centrally of the contactable surface of the strain sensor with respect to the two opposing edges thereof and extending to or towards the edge of the outer profile of the rigid support.

8. A strain-sensing device according to claim 7 wherein the protrusion has a mechanical impedance substantially equal to that of the packaging element.

9. A strain sensor according to claim 2 wherein the at least one contact comprises a first pair of electrical contacts each of which contacts a portion of a first major surface of the viscous piezoresistive element.

10. A strain sensor according to claim 2 wherein the at least one contact comprises a pair of electrodes each of which contacts a portion of a major surface of the viscous piezoresistive element.

11. A strain sensor according to claim 10 wherein each electrode is in contact with substantially the whole of a major surface of the viscous piezoresistive element.

12. A strain sensor according to claim 1 wherein the viscous piezoresistive element comprises a graphene-doped polymer and/or the packaging element comprises silicone.

13. Strain-sensing apparatus comprising either a strain sensor according to claim 1, and a detector configured to obtain a measure of the resistance of the electrical path.

14. Strain-sensing apparatus according to claim 13 wherein the detector comprises a constant current source arranged to drive a constant current through the electrical path and wherein the strain sensor further comprises either (a) a measuring system configured to measure the voltage across the electrical path or (b) an AC-coupled amplifier for amplifying time-varying components of a voltage across the electrical path.

15. A strain sensor, comprising:
    a viscous piezoresistive element encapsulated within a packaging element and deformable in a first direction without being deformable in a second direction;
    a first contact on a first surface of the viscous piezoresistive element and a second contact on a second opposing surface of the viscous piezoresistive element, the first contact and the second contact being configured to be contacted from an exterior of the strain sensor and defining an electrical path through or along at least a portion of the viscous piezoresistive element; and
    a capacitive filter in the electrical path, the capacitive filter being configured to block a varying voltage across the viscous piezoresistive element;
    wherein a resistance of the electrical path varies with a stretching of the first surface and a compression of the second surface.

16. The strain sensor of claim 15, wherein the viscous piezoresistive element is graphene-doped cross-linked polysilicon.

* * * * *